US007480813B2

(12) United States Patent
Asoh et al.

(10) Patent No.: US 7,480,813 B2
(45) Date of Patent: Jan. 20, 2009

(54) PORTABLE ELECTRONIC APPARATUS HAVING A TRANSFER MODE FOR STOPPING AN OPERATING STATE OF A DEVICE

(75) Inventors: Junichi Asoh, Machida (JP); Takashi Yomo, Fujisawa (JP)

(73) Assignee: Lenovo (Singapore) Pte., Ltd., Singapore (SG)

( * ) Notice: Subject to any disclaimer, the term of this patent is extended or adjusted under 35 U.S.C. 154(b) by 50 days.

(21) Appl. No.: 10/908,684

(22) Filed: May 23, 2005

(65) Prior Publication Data

US 2005/0278557 A1     Dec. 15, 2005

(30) Foreign Application Priority Data

Jun. 11, 2004   (JP)   ............................. 2004-174590

(51) Int. Cl.
  *G06F 1/32*     (2006.01)
(52) U.S. Cl. ........................................ 713/324; 713/320
(58) Field of Classification Search .................... 713/2, 713/324
  See application file for complete search history.

(56) References Cited

U.S. PATENT DOCUMENTS

| 5,235,532 | A | * | 8/1993 | Sugino | 713/321 |
| 5,303,171 | A | * | 4/1994 | Belt et al. | 713/321 |
| 6,044,473 | A | * | 3/2000 | Kim | 713/320 |
| 6,105,142 | A | * | 8/2000 | Goff et al. | 713/324 |
| 6,243,819 | B1 | * | 6/2001 | Jung | 713/320 |
| 6,760,851 | B2 | * | 7/2004 | Teshima et al. | 713/320 |
| 2005/0076087 | A1 | * | 4/2005 | Budd et al. | 709/206 |

FOREIGN PATENT DOCUMENTS

| EP | 09-034577 A |  | 2/1997 |
| EP | 09-114566 A |  | 5/1997 |
| EP | 2001-042978 A |  | 2/2001 |
| JP | 403235263 A | * | 10/1991 |
| JP | 11-015548 |  | 1/1999 |
| JP | 2001-042978 | * | 2/2001 |
| JP | 2001-209466 |  | 8/2001 |

* cited by examiner

*Primary Examiner*—Chun Cao
(74) *Attorney, Agent, or Firm*—Ference & Associates LLC (57) ABSTRACT

A portable notebook PC comprising a lid is able to avoid possible trouble during its transfer (as when a user carries the PC with him or her) and is able to reduce the time required to start up after the transfer. The portable notebook PC has a normal operating mode in which a user can utilize the notebook PC, a power saving mode in which an operation performed in the normal operating mode is saved to a predetermined memory so that power consumption can be reduced by using the minimum power required to retain data, and a transfer mode in which the system is temporarily disabled by stopping functions that may become defective during the transfer with a CPU remaining operative.

16 Claims, 8 Drawing Sheets

PORTABLE ELECTRONIC APPARATUS HAVING A TRANSFER MODE FOR STOPPING AN OPERATING STATE OF A DEVICE

BACKGROUND OF THE INVENTION

The present invention relates to various electronic apparatus including a notebook type personal computer, and more specifically, to a portable electronic apparatus used by opening a lid.

Electronic apparatuses such as a notebook type personal computer (notebook PC) comprise a power saving (power management) function to appropriately reduce or stop a power supply to an electric circuit in accordance with the usage of a system. The power management function includes a sleep function to turn off a backlight of a liquid crystal display device (LCD) and stop operations of a CPU and a hard disk drive (HDD). In addition to the sleep function, the power management function includes a suspend function to stop a power supply to peripheral apparatuses and the like so as to use the minimum amount of power required to retain data. The power management function further includes a hibernation function to turn off a power supply to the computer, while automatically saving the contents of an operation performed until immediately before the turnoff, to an HDD. The suspend stops the CPU, LCD, HDD, and the like to minimize power consumption. However, with the suspend function, unlike the hibernation function, power remains supplied to a RAM. Accordingly, a little power is consumed.

The power management function is not very convenient to users. For example, when the suspend mode is set while an expansion device such as an option card is being used, the option card and the like must be initialized for each software driver after a resume (the power supply is turned on to resume an operation starting with the last state) process. A long time is required before the system can be recovered during the resume. Thus, a conventional technique described in a patent publication is disclosed which falsely powers off the system with these devices operative to instantaneously recover the system (see, for example, Patent Document 1).

Once the suspend has been entered, when the input of a password is required during resume, usability (operability) may disadvantageously be degraded. Thus, another technique described in a patent publication enables a task to be instantaneously resumed without requiring the input of a password during the resume if the user reacts by executing key inputs a relatively short time after a shift to the suspend has occurred (see, for example, Patent Document 2). Moreover, in connection with the power management function, a technique has been disclosed which shifts to a sleep state when a lid is closed, while shifting to a hibernation state when the apparatus is lifted, in order to save time required to save or recover the state (see, for example, Patent Document 3).

[Patent Document 1] Published Unexamined Patent Application No. 9-114566 (p. 8, FIG. 7)

[Patent Document 2] Published Unexamined Patent Application No. 9-34577 (p. 9, FIG. 5)

[Patent Document 3] Published Unexamined Patent Application No. 2001-42978 (p. 7, FIGS. 4 and 5)

SUMMARY of the INVENTION

A notebook PC will be described by way of example. With a conventional notebook PC, when a lid is closed, the Windows® (registered trademark of Microsoft Corporation) shifts the system to the suspend state by default. Subsequently, the suspend must be shifted to the resume to enable the CPU and other functions stopped to be resumed. However, about several tens of seconds are required to activate the CPU and start up various functions. In particular, a wireless network function has been popular in recent years. Accordingly, for example, in a wireless network environment within the same office, the notebook PC is often moved. In such a case, about 30 seconds are required to resume accesses to the wireless network. Consequently, even if a user desires to immediately use the apparatus, the use is limited.

On the other hand, electronic apparatus such as the notebook PC contain an apparatus such as an HDD which is likely to become defective during a transfer. For example, if the HDD is transferred in an operative state, when the HDD is shocked while a head of the HDD is on a disk, malfunction may occur or the disk may be damaged. Accordingly, for example, even when the user desires to immediately use the notebook PC after transferring it, it is not preferable to unstably transfer the notebook PC with its lid open because the user may drop the notebook PC during the transfer. Further, during the transfer, components which are not used and which can be started up quickly are preferably halted in order to reduce the power consumption of batteries.

Embodiments of the present invention are provided to solve the above technical problems. It is a purpose of the present invention to provide a portable electronic apparatus in which difficulties involved in a transfer (while the electronic apparatus is being carried) are reduced to shorten a start-up time required after the transfer.

It is another purpose of the present invention to provide an electronic apparatus such as a notebook PC in which a new mode (transfer mode) is defined for a transfer so that a password is requested in response to a transition of the mode, thus enabling a user to conveniently start up the apparatus after the transfer.

To accomplish the above purposes, the present invention provides a portable electronic apparatus, the electronic apparatus comprising a body having a CPU therein, a lid, wherein said electronic apparatus be used by opening the lid for the body, a sensing mechanism that senses that the lid is opened or closed, first means for stopping a certain function that may be affected by a transfer of the electronic apparatus without stopping the CPU in response to sensing that the lid is closed in a state in which a normal operation can be performed, and second means for clearing the stoppage of the function and shifting to the state in which the normal operation can be performed in response to sensing that the lid is opened.

In this case, if the electronic apparatus is characterized in that the function stopped by the first means is a hard disk drive, and a head of the hard disk drive is unloaded, it is preferably possible to prevent a drive from being damaged by a shock upon a fall during a transfer. Further, if the first means is characterized by further turning off a display device, it is excellent in its ability to sharply reduce the power consumption of batteries. In this case, for example, with the notebook PC, the lid is opened before the display device can be used. Accordingly, while the lid is closed, turning on the display device is meaningless and the display device is preferably turned off.

The electronic apparatus can further be characterized by comprising third means for saving a state of an operation performed to a predetermined memory to stop the CPU on condition that a predetermined time has elapsed since the first means stopped the function. Moreover, the electronic apparatus is characterized in that the second means allows a shift to a state in which the normal operation can be performed without requesting a user to input a password, and in a case where a state in which said CPU is stopped by said third means shifts to a state in which the normal operation can be performed, the user is requested to input the password. Then, the electronic apparatus can be operated immediately after the lid is opened after a transfer, which is preferable.

On the other hand, the electronic apparatus according to the present invention comprises a sensing mechanism that senses that the lid is opened or closed, first means for stopping a predetermined one of devices that do not require a predetermined time to start up without stopping devices that require at least the predetermined time to start up in response to sensing that the lid is closed in a state in which a normal operation can be performed, and second means for clearing the stoppage of the predetermined device and shifting to the state in which the normal operation can be performed in response to sensing that the lid is opened.

Here, the "predetermined time" is, for example, over 10 seconds, the time for which a user using the notebook PC as an electronic apparatus can wait without feeling unpleasant. The "predetermined time" depends on the type of the electronic apparatus and the conditions under which the notebook PC is used. Further, the devices that require at least the predetermined time to start up are characterized by being devices for a wireless LAN and/or CD-ROM drives, and are characterized in that the predetermined device is a hard disk drive.

In another aspect, the present invention provides a portable electronic apparatus which may be in any one mode of a normal operation mode in which a user can utilize the electronic apparatus, a power saving mode in which an operation performed in the normal operation mode is saved to the predetermined memory and in which power consumption is reduced by using a minimum amount of power required for data saving, and a transfer mode in which a function that may be affected while the electronic apparatus is being transferred is temporarily disabled with the CPU remaining operative.

Here, if the electronic apparatus is characterized in that the user is requested to input the password in a case where the power saving mode shifts to the normal operation mode, and the user is not requested to input the password in a case where the transfer mode shifts to the normal operation mode. Then, it is possible to maintain a good balance between operational performance and security performance in accordance with the usage.

Further, the electronic apparatus can be characterized in that the electronic apparatus has a lid, and a shift to the transfer mode occurs if the lid is closed in the normal operation mode, and if a predetermined time has elapses in the transfer mode, a shift to the power saving mode occurs. The electronic apparatus can further be characterized in that a shift to the transfer mode occurs if the lid is closed in the normal operation mode, and if the lid is opened in the transfer mode, a shift to the normal operation mode occurs. The electronic apparatus can further be characterized in that in the transfer mode, a head of a hard disk drive of the electronic apparatus is unloaded and a display device of the electronic apparatus is turned off.

In the category of a method, the present invention provides a method of controlling a portable electronic apparatus, the method comprising a first step of setting the electronic apparatus in a normal operation mode corresponding to a normal use state, and a second step of, in response to sensing that a lid of the electronic apparatus is closed in the normal operation mode, shifting the electronic apparatus to a transfer mode in which a function that may be affected while the electronic apparatus is being transferred is temporarily disabled with a CPU of the electronic apparatus remaining operative.

The method can be characterized by further comprising a third step of shifting the electronic apparatus to the normal operation mode in response to sensing that the lid is opened in the transfer mode and in that the third step shifts the transfer mode to the normal operation mode without requesting a user to input a password. The method can further be characterized by further comprising a fourth step of saving an operation performed in the normal operation mode to a predetermined memory after a predetermined time has elapsed in the transfer mode, and shifting the electronic apparatus to a power saving mode in which a minimum amount of power required to retain data is used to save power consumption.

A program product, to which the present invention is applied, including: a program storage device readable by a portable computer and a program of instructions tangibly embodied on the program storage device and executable by the portable computer to perform method steps for controlling the portable computer, the method steps comprising: (a) in response to closing of a lid of said computer in a normal operation mode corresponding to a normal use state, shifting the computer to transfer mode in which a function that may be affected while the electronic apparatus is being transferred is temporarily disabled with a CPU remaining operative, (b) shifting said computer to said normal operation mode in response to opening of said lid in said transfer mode, (c) saving an operation performed in said normal operation mode to a predetermined memory after a predetermined time has elapsed in said transfer mode and shifting said computer to a power saving mode in which minimum power required to retain data is used to save power consumption, and (d) shifting said computer from said power saving mode to said normal operation mode. The program product is further characterized in that with (b) step, a shift to the normal operation is executed without requesting a password from a user, and with (d) step, a shift to the normal operation is executed by requesting the password from the user.

Preferred embodiments of the present invention impart capability to a portable electronic apparatus, for example, a notebook PC, to avoid possible trouble during a transfer and enables a reduction in the time required to start up the apparatus after the transfer.

BRIEF DESCRIPTION of the DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
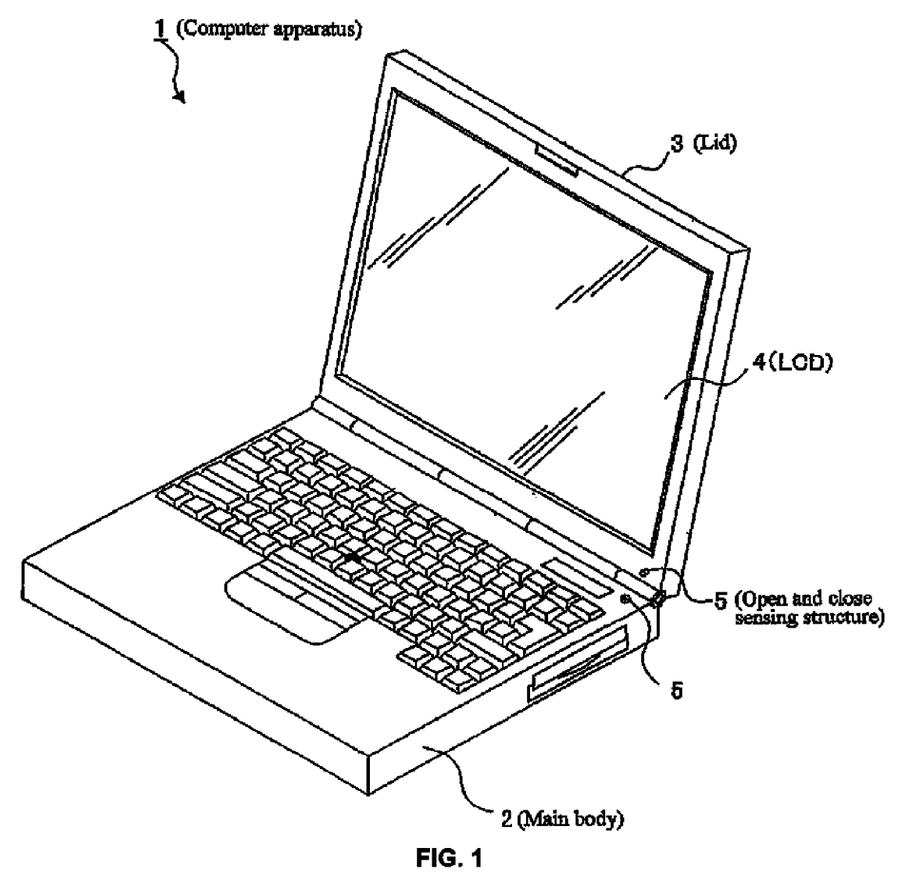
FIG. 1 is a view showing the appearance of a notebook type personal computer (notebook PC)

Referring now more particularly to the accompanying drawings, in which like numerals indicate like elements or steps throughout the several views, FIG. 1 is a view showing the appearance of a computer apparatus 1 such as a notebook type personal computer (notebook PC). The present embodiment is applied to a portable electronic apparatus represented by the notebook PC. However, the present embodiment is not necessarily limited to the notebook PC. The present embodiment is applicable to other electronic apparatuses having a lid. The computer apparatus 1 shown in FIG. 1 comprises a main body 2 which accommodates a system board with a CPU and peripheral apparatuses and which has a keyboard disposed on its top surface, and a lid 3 having a LCD (Liquid Crystal Display) 4 buried in its inner substantially central part. The main body 2 and the lid 3 are rotatably hinged together at a rear edge of the computer apparatus. Specifically, the computer apparatus 1 shown in FIG. 1 is a structure comprising the lid 3. The lid 3 is opened for the main body 2 when the computer apparatus 1 is used and is closed for the main body 2 when the computer apparatus 1 is not used or is transferred. Further, an open and close sensing structure 5 is provided in each of the main body 2 and lid 3 to sense that the lid 3 is opened or closed. The open and close sensing structure 5 senses that the lid 3 is opened or closed to notify the system in the main body 2 of this. The open and close sensing structure 5, a sensing mechanism, is provided at a rear edge of each of the main body 2 and lid 3. For example, a convex projection is formed on the lid 3, and a concave sensor is formed in the main body 2. Closing the lid 3 causes the convex projection to be fitted into the concave sensor in the main body 2. Consequently, closing of the lid 3 is detected.

Figure 2:
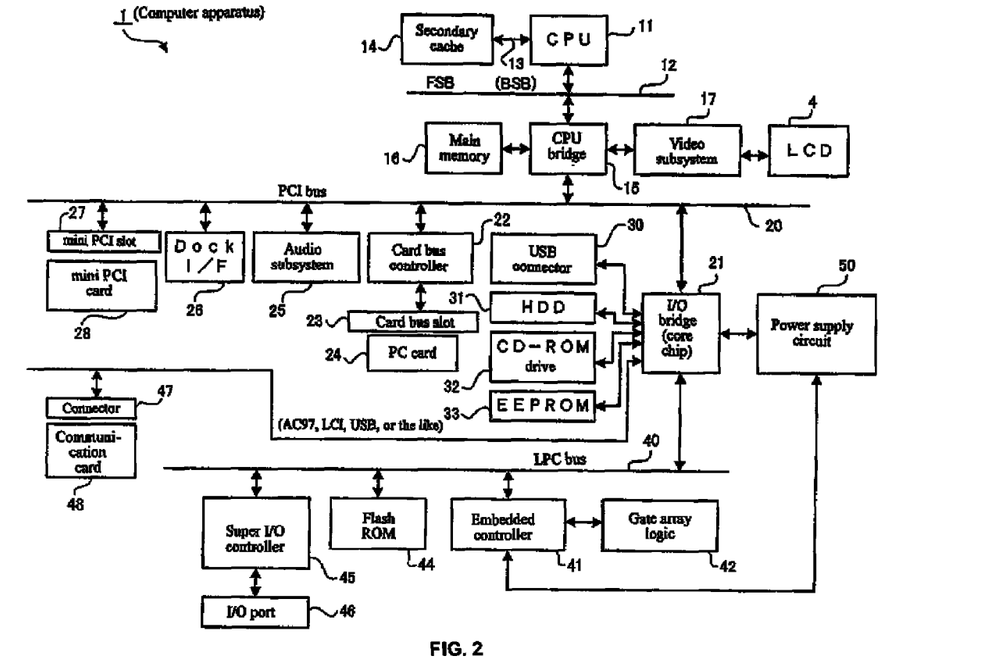
FIG. 2 is a diagram showing a system configuration in terms of hardware in the computer apparatus.

FIG. 2 is a diagram showing a system configuration in terms of hardware in the computer apparatus 1. A CPU 11 in the computer apparatus 1 functions as a brain of the whole computer apparatus 1. The CPU 11 executes various programs under the control of an OS. The CPU 111 is interconnected with components via three buses including an FSB (Front Side Bus) 12 that is a system bus, a PCI (Peripheral Component Interconnect) bus 20 serving as a high-speed I/O device bus, and an LPC (Low Pin Count) bus 40 that is an interface that replaces an ISA bus. The CPU 11 accumulates program codes and data in a cache memory to increase a processing speed. To make up for the insufficiency of the capacity of a primary cache provided inside the CPU 11, a secondary cache 14 may be placed via a BSB (Back Side Bus) 13 that is an exclusive bus.

The FSB 12 and the PCI bus 20 are connected together via a CPU bridge (host-PCI bridge) called memory/PCI chip. The CPU bridge 15 includes a memory controller function for controlling accesses to a main memory 16 and a data buffer that serves to absorb the difference in data transfer rate between the FSB 12 and the PCI bus 20. The main memory 16 is a writable memory used as an area into which execution programs for the CPU 11 are loaded or an area in which processed data is written. The execution programs include the OS, various drivers, various application programs, and firmware such as a BIOS (Basic Input/Output System). A video subsystem 17 executes functions relating to video and includes a video controller. The video controller processes a draw command from the CPU 11 to write drawing information to a vide memory. The video controller reads the drawing information from the video memory to output it to the LCD 4 as drawing data.

The PCI bus 20 connects to an I/O bridge 21, a card bus controller 22, an audio subsystem 25, a docking station interface (Dock I/F) 26, and a mini PCI connector (slot) 27. The card bus controller 22 is an exclusive controller for coupling a bus signal on the PCI bus 20 directly to an interface connector (card bus) in a card bus slot 23. A PC card 24 can be installed in the card bus slot 23. The docking station interface 26 is hardware to which a docking station (not shown) that is an expansion device of the computer apparatus 1 is connected. When a notebook PC (computer apparatus 1) is set in the docking station, hardware components connected to an internal bus in the docking station are connected to the PCI bus 20 via the docking station interface 26. Further, a mini PCI card 28 containing, for example, a wireless LAN module is connected to the mini PCI connector 27.

The I/O bridge 21 has a bridge function for the PCI bus 20 and the LPC bus 40. The I/O bridge 21 also has an IDE (Integrated Device Electronics) interface function. A hard disk drive (HDD) 31 is connected to an interface realized by the IDE interface function. A CD-ROM drive 32 is also connected to the interface via an ATAPI (AT Attachment Packet Interface). Instead of the CD-ROM drive 32, another type of IDE device such as a DVD (Digital Versatile Disc) drive may be connected. Further, the I/O bridge 21 is provided with a USB port to which a USB connector is connected. Moreover, an EEPROM 33 is connected to the I/O bridge 21 via an SM bus. Further, a connector 47 is connected to the I/O bridge 21 via an AC97 (Audio CODEC '97) that supports a modem function, an LCI (LAN Connect Interface) that is an interface for the Ethernet (registered trademark) contained in a core chip, a USB, or the like. A communication card 48 is connectible to the connector 47.

Moreover, the I/O bridge 21 is connected to a power supply circuit 50. An AC adapter, batteries, and the like can be connected to the power supply circuit 50. To the LPC bus 40 connected are an embedded controller 41, a flash ROM 44, and a super I/O controller 45. To the LPC bus 40 also connected are peripheral apparatuses such as a keyboard/mouse controller 45 which operate at relatively low speed. Further, a gate array logic 42 is connected to the embedded controller 41. An I/O port 46 is connected to the super I/O controller 45. The embedded controller 41 controls the keyboard (not shown) and provides part of a power supply management function for a power supply circuit 50. The embedded controller 41 also has a function for sensing and processing an event from the open and close sensing structure 5, shown in FIG. 1.

Now, description will be given of a "transfer mode" that is a state defined according to the present embodiment. The present embodiment defines the "transfer mode" as the state in which when a user carries the notebook PC (computer apparatus 1) with him or her, the notebook PC is temporarily disabled so as to be immediately used after a transfer. In the transfer mode, when the lid 3 is closed, a normal suspend is not carried out. The CPU 11 and other devices are kept in a normal state without being taken off; the other devices include a device relating to a wireless LAN and the CD-ROM drive 32 and require at least over 10 seconds to start up. On the other hand, in the transfer mode, functions are turned off which does not require a long time to start up and which may be affected by a transfer of the apparatus main body; for example, a function for preventing an operation of the HDD 31 during a transfer is utilized to temporarily turn off the HDD 31. In the transfer mode, when the lid 3 is opened, a resume process is not required. Accordingly, the notebook PC can immediately be used. If the notebook PC is left in the transfer mode, a timer is utilized to automatically shift the notebook PC to a suspend mode or a sleep mode (halt state).

Figure 3:
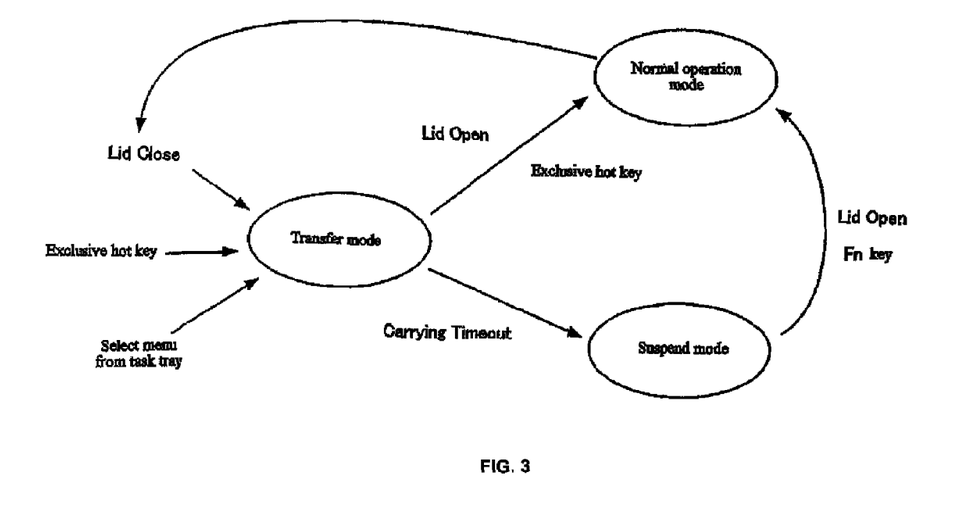
FIG. 3 is a diagram illustrating the transition of state of the computer apparatus including a transfer mode state.

FIG. 3 is a diagram illustrating the transition of a state of the computer apparatus 1 including the transfer mode state. When the lid 3 is closed while the notebook PC (computer apparatus 1) is in the normal operation mode, the state of the notebook PC shifts to the transfer mode. Further, for example, an exclusive hot key requesting the LCD 4 to be turned off may be provided so that the transfer mode is entered by depressing this key. Moreover, the normal operation mode can be shifted to the transfer mode by selecting a menu in a task tray of the Windows (registered trademark). In the transfer mode, the HDD 31 enters a head unload state, and the LCD 4 is turned off. Further, generation of a video signal for the LCD 4 is turned off. In the transfer mode, when the lid 3 is opened or the transfer mode-exclusive hot key is depressed again, the notebook PC shifts to the normal operation mode. On the other hand, once a specified time has elapsed since the transfer mode was entered (Carrying Timeout), the state of the notebook PC shifts to the normal suspend mode. For the conventional notebook PC, when the apparatus main body has not been used for a specified time (inputs from the keyboard or a pointing device have been stopped for the specified time), the apparatus shifts to the suspend mode in order to increase the time for which the batteries are available for driving; in the suspend mode, the system is halted with the current contents of the memory and the status of the CPU 11 saved. In the present embodiment, the transfer mode shifts to this suspend mode. The suspend mode produces the highest power saving effect in the power management function. In the suspend mode, a display on the LCD 4 is turned off, the operation of the CPU 11 is stopped, and a power supply to the HDD 31 is turned off. Moreover, if the CD-ROM drive 32 and, for example, a flexible disk drive are mounted in the notebook PC, power supplies to these components are also cut off. Subsequently, in the suspend mode, when the lid 3 is opened and, for example, an Fn key is depressed, the notebook PC shifts to the normal operation mode. In the normal operation mode, an ACPI (Advanced Configuration and Power Interface) that is a power control interface performs control such that the whole power is turned on (ACPI Full ON state).

The computer apparatus 1 basically shifts to the transfer mode when the lid 3 of the computer apparatus 1 is closed or when the hot key is depressed. However, tablet type PCs (having no lids 3) have recently been available. With such PCs taken into account, other shifting means may be employed to shift to the transfer mode. For example, a "transfer mode" button is provided and depressed or a transfer mode menu is selected from a task tray of an application. In such a case, to shift from the transfer mode to the normal use mode (normal operation mode), it is possible to, for example, use a pen to tap a screen or depress the transfer mode button again.

In the present embodiment, the security level of the system is varied depending on the transition of the state shown in FIG. 3. For example, when the transfer mode shifts to the normal operation mode, the apparatus start up without requesting the user to input a password. When the suspend mode shifts to the normal operation mode, the user is requested to input the password. In other words, when the transfer mode shifts to the normal operation mode, top priority is given to convenience. The apparatus immediately starts up without requesting the user to input the password. On the other hand, when the suspend mode, a power saving mode, shifts to the normal operation mode, top priority is given to safety because the apparatus has not been used for a long time. The user is requested to input the password, and once the password is input correctly, a start-up process is executed. Thus, in the present embodiment, the password is requested depending on the state in which the apparatus is to start up. This makes it possible to keep balance between provision of security and improvement of operability.

Now, description will be given of the system configuration (mainly a software configuration) of the computer apparatus 1 for realizing the above state transition.

Figure 4:
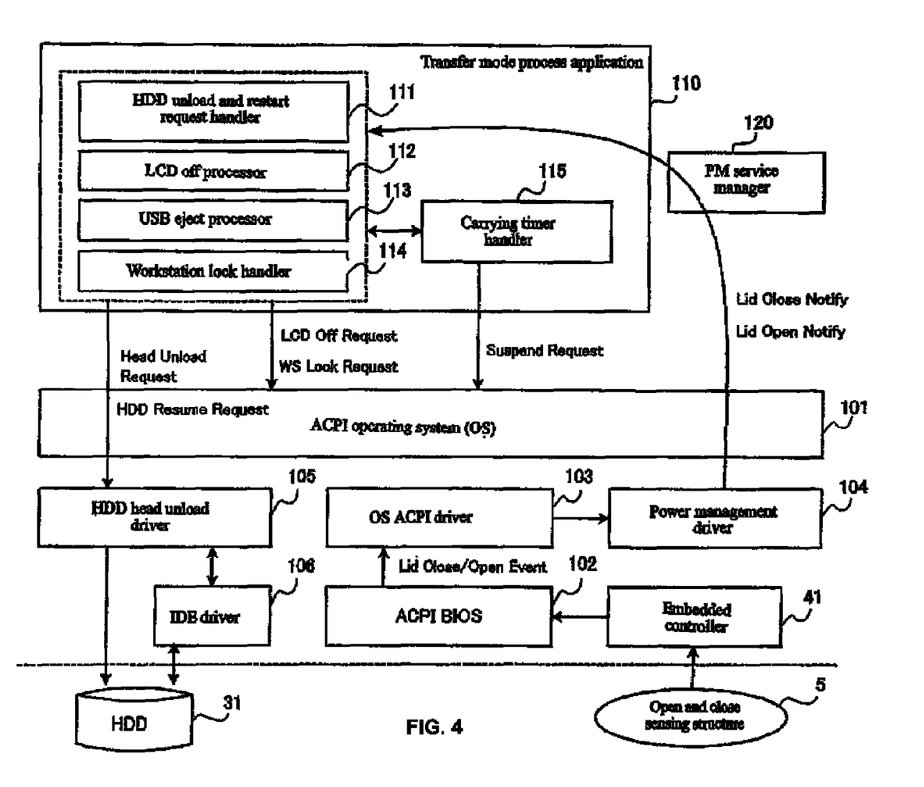
FIG. 4 is a diagram showing an embodiment of software according to the present embodiment.

FIG. 4 shows an embodiment using the software according to the present embodiment. The embodiment shown in FIG. 4 comprises an ACPI operating system (OS) 101 which manages the system of the computer apparatus 1 and which provides a basic user operation environment, a transfer mode process application 110 that manages the transfer mode according to the present embodiment, and a PM service manager 120 that operates the transfer mode process application 110 in response to a notification, from a power management driver 104 described later, of opening or closing of the lid 3. The transfer mode process application 110 executes a process required when the lid 3 of the computer apparatus 1 is closed or when the hot key is depressed to request a shift to the transfer mode, or a process required if a specified time has elapsed since a shift to the transfer mode.

The computer apparatus 1 shown in FIG. 4 comprises an ACPI BIOS 102 that is a program for controlling various devices, an OS ACPI driver 103 that supports the ACPI, and a power management driver 104 that manages power saving. The computer apparatus 1 further comprises an HDD head unload driver 105 that receives a command from the transfer mode process application 110 to block reads and writes to the hard disk drive (HDD) 31 or clear the blockage of reads and writes, and an IDE driver 106 that is a device driver for accesses to the HDD 31.

The embedded controller 41 of the computer apparatus 1 senses an event in which the lid 3 of the notebook PC (computer apparatus 1) is closed or opened. The embedded controller 41 then notifies the ACPI BIOS 102 of the computer apparatus 1 of the information. The ACPI BIOS 102 notifies the OS ACPI driver 103, an event notifying mechanism of the operating system (OS), of a lid close/open event of the lid 3. The ACPI BIOS 102 further notifies the OS ACPI driver 103, via the power management driver 104, that the lid 3 is closed and that the lid 3 is opened; the power management driver 104 is a device driver utilized by the transfer mode process application 110.

On the other hand, the transfer mode process application 110 comprises an HDD unload and restart request handler 111 that makes a request for unloading or restarting of the HDD 31, an LCD off processor 112 that puts out the light for the screen of the LCD 4 on reception of the notification of a close event of the lid 3, a USB eject processor 113 that permits the USB device to be removed when the lid 3 is closed, and a workstation lock handler 114 that causes a workstation of the computer apparatus 1 to be locked. The transfer mode process application 110 also comprises a carrying timer handler 115 that observes the elapse of a specified time after the lid 3 has been closed.

In the block shown in FIG. 4, the process described below is executed when the components are notified of the event in which the lid 3 is closed.

First, the carrying timer handler 115 of the transfer mode process application 110 utilizes an API (Application Program Interface) provided by the ACPI operating system (OS) 101 to measure the time for which the lid 3 is closed. Further, the LCD off processor 112 utilizes a call to the internal software in the computer apparatus 1 to put out the screen of the LCD 4. The hardware may be used to put out the light for the screen by mechanically detecting the open and close sensing structures 5, which constitute an open and close switch for the lid 3. If the user specifies that the computer apparatus 1 be locked before closing the lid 3, the workstation lock handler 114 uses the API of the ACPI operating system (OS) 101 to carry out a workstation lock.

Moreover, the HDD unload and restart request handler 111 sends a head unload execution command (head unload request) to the HDD head unload driver 105, a hardware controlling device driver that accesses the HDD 31 of the computer apparatus 1. On reception of the head unload request execution command from the transfer mode process application 110, the HDD head unload driver 105 stores all IO request packets transferred via the ACPI operating system (OS) 101 and containing requests for reads from or writes to the HDD 31, in an internal memory queue of the HDD head unload driver 105. The HDD head unload driver 105 then causes the requests for reads from and writes to the HDD 31 to be blocked. As a result, the read/write requests are blocked for the IDE driver 106, a device driver for hard disk accesses, thus stopping accesses to the HDD 31. Finally, the HDD head unload driver 105 issues, to the HDD 31, a command for withdrawal of the head or a standby immediate command that is a power control command, to withdraw the head of the HDD 31 from a surface of the hard disk. This ensures the HDD 31 to be safely stopped even while the notebook PC (computer apparatus 1) is being transferred.

On the other hand, when the components receive the notification of the event in which the lid 3 is opened, the process described below is executed.

First, the transfer mode process application 110 lights the screen of the LCD 4. Instead of the application, a hardware switch (open and close sensing structures 5) that senses that the lid 3 is opened or closed may be used for this operation. Further, the HDD unload and restart request handler 111 notifies the HDD head unload driver 105 that the reads/writes blocked state of the HDD 31 is to be cleared. The HDD head unload driver 105 sequentially delivers the read and write requests for the HDD 31 which have been blocked, to the IDE driver 106. This allows the requests temporarily blocked to be resumed.

Now, description will be given of a process executed if a specified time has elapsed with the lid 3 closed.

First, when the specified time has elapsed with the lid 3 closed, a notification of a timer from the ACPI operating system (OS) 101 allows the system of the notebook PC (computer apparatus 1) to shift the temporary state of the transfer mode to the suspend mode. The procedure will be described below. First, the ACPI operating system (OS) 101 notifies the transfer mode process application 110 that the timer indicates that the specified time has elapsed. The transfer mode process application 110 switches it internal state from the transfer mode to the suspend mode. Then, the HDD unload and restart request handler 111 notifies the HDD head unload driver 105 that the blockage of the read/write requests is to be cleared. This releases the requests for the HDD 31 which have been temporarily blocked, resulting in the normal operation state. Then, the API of the ACPI operating system (OS) 101 is utilized to shift the state of the system to the suspend.

With reference to the block configuration shown in FIG. 4, description will be given of the flow of a process executed by the computer apparatus 1. Although the description below partly overlaps the above description of the process, a detailed description will be given with reference to a flowchart for easy understanding.

Figure 5:
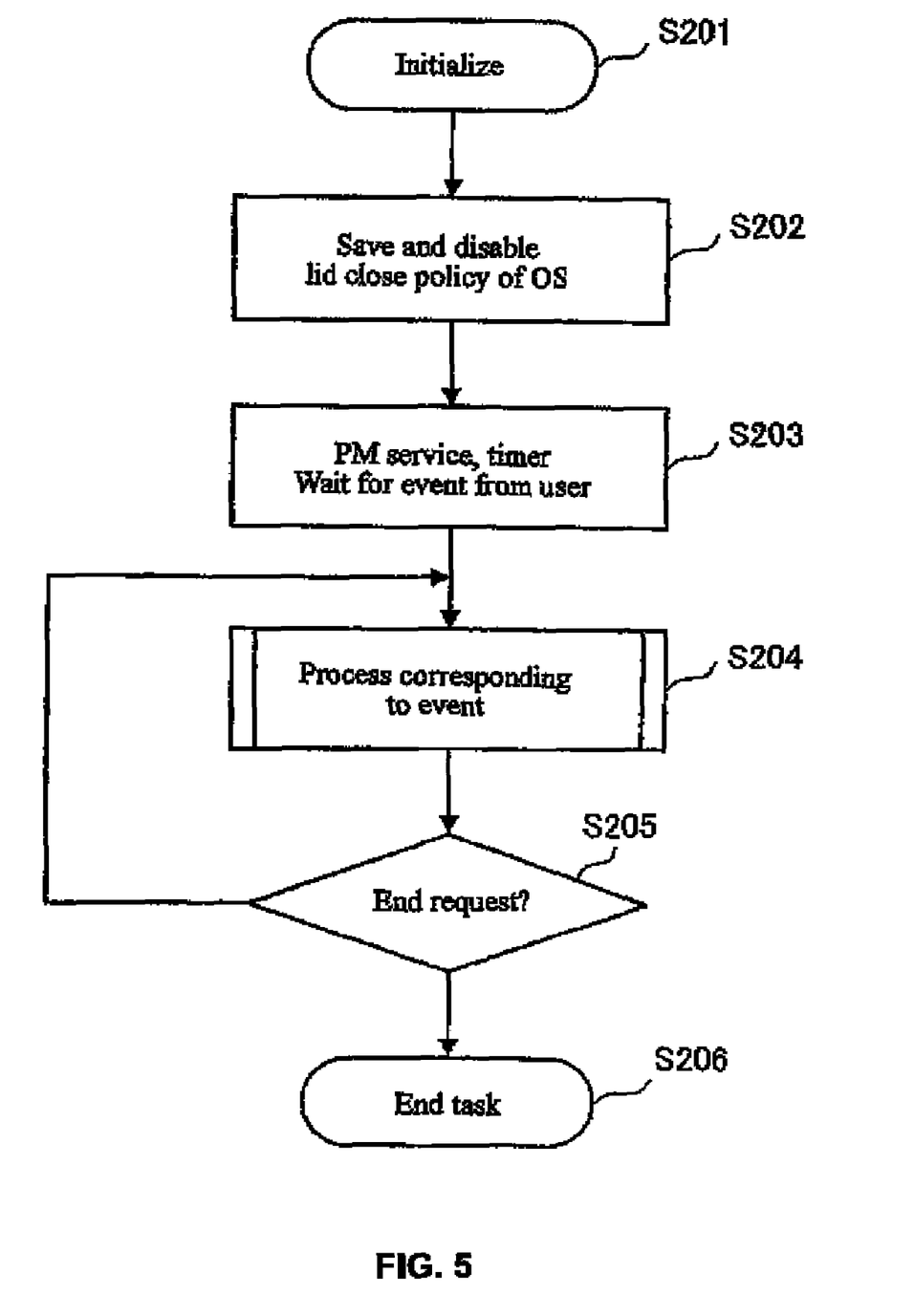
FIG. 5 is a diagram showing the flow of a basic process according to the present embodiment.

FIG. 5 is a flowchart showing the flow of a basic process according to the present embodiment. In a process executed by a resident program shown in FIG. 5, first, initialization is carried out to start up the transfer mode process application 110 (step 201). With the conventional notebook PC, when the lid 3 is closed, the apparatus shifts to the suspend state. However, in the present embodiment, this state shift must be disabled. Thus, the transfer mode process application 110 requests the ACPI operating system (OS) 101 to change a policy so that a policy executed when the lid 3 is closed is saved. The conventional shift process is thus disabled (step 202).

Subsequently, the transfer mode process application 110 waits for an event from the user via the PM service manager 120 (step 203). The transfer mode process application 110 waits for the lid open/close event of the lid 3, an event from the keyboard in which the key corresponding to the transfer mode has been depressed, or an event in which the timer indicates that a specified time has elapsed since the closure of the lid 3 (Carrying Timeout). The transfer mode process application 110 executes a process corresponding to the event occurring (step 204). The process corresponding to the event will be described in detail with reference to FIGS. 6 to 8. Subsequently, it is determined whether or not an end request has been issued (step 205). If no end request has been issued, the process returns to step 204 to execute the process corresponding to the event. Then, when an end request is issued, the task is finished (step 206).

Figure 6:
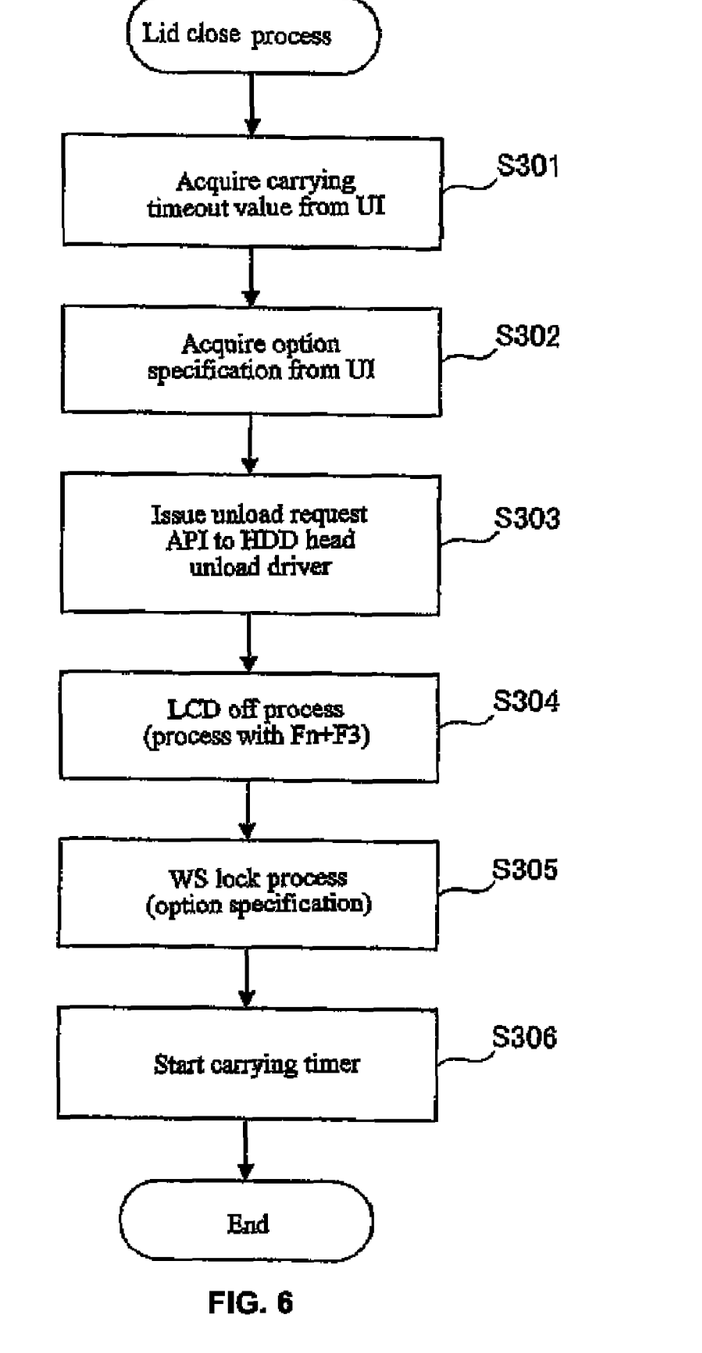
FIG. 6 is a flowchart showing a process executed when a lid is closed.

FIG. 6 is a flowchart showing a process executed when the lid 3 is closed. In the lid close process, if for example, the user makes settings such that "the suspend is carried out if the lid is not opened after three minutes have elapsed, the carrying timer handler 115 of the transfer mode process application 110 acquires a carrying timeout value from the user interface (UI) (step 301). Further, if there are optional settings such that "the user is not requested to input the password when the lid is opened after being closed", then the carrying timer handler 115 acquires the option specification from the UI (step 302). Moreover, the carrying timer handler 105 issues an unload request API to the HDD head unload driver 105 to move the head of the HDD 31 to a standby area (step 303). Then, as in the case of the process with the hot key Fn+F3, the backlight of the LCD 4 is put out to turn off the LCD 4 (step 304). If the option specification indicates a workstation lock, a workstation lock (WS lock) process is executed (step 305). Then, the timer is started (step 306) to finish the lid close process. The computer apparatus 1 enters the transfer mode.

Figure 7:
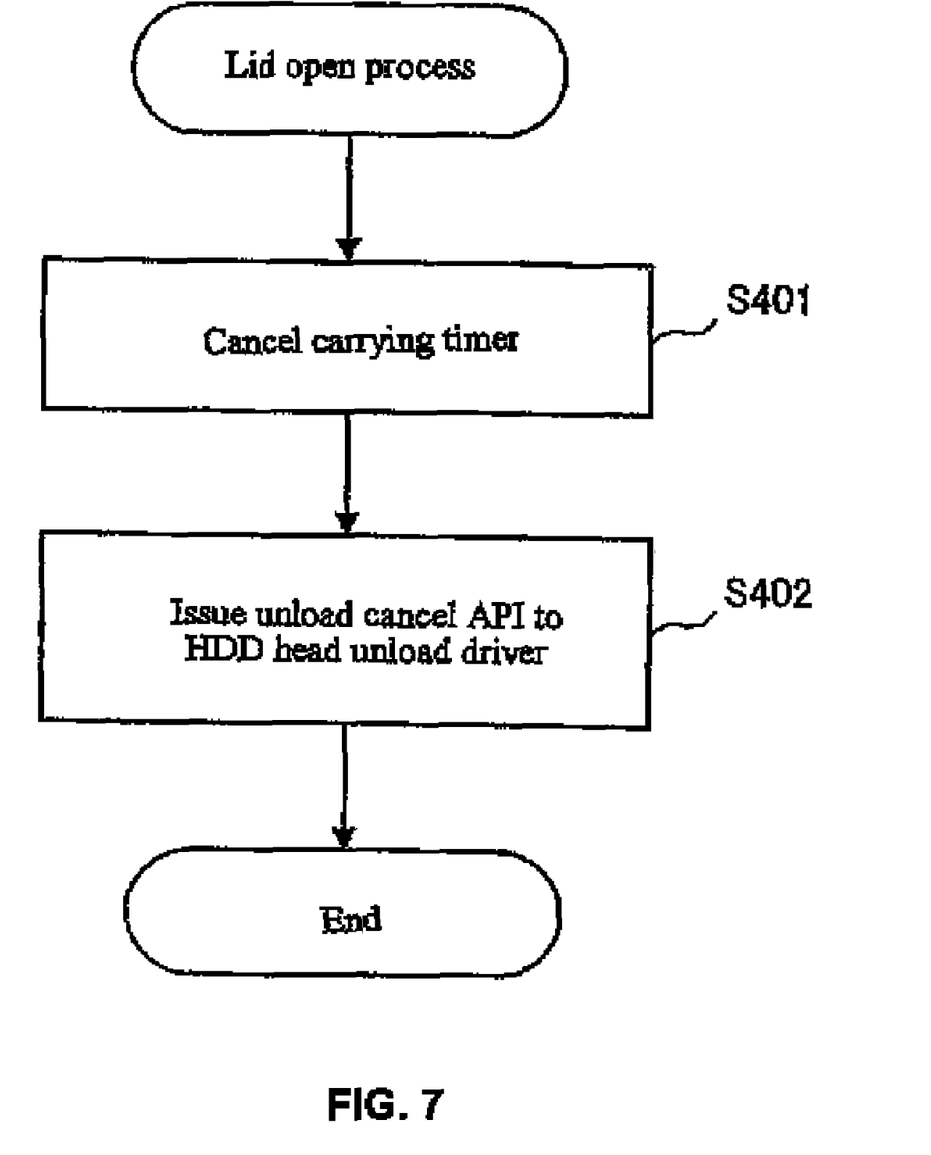
FIG. 7 is a flowchart showing a process executed when the lid is opened.

FIG. 7 is a flowchart showing a process executed when the lid 3 is opened. In the lid open process, first, the carrying timer handler 115 of the transfer mode process application 110 cancels a carrying timer (step 401). Further, the HDD unload and restart request handler 111 issues an unload clear API to the HDD head unload driver 105 (step 402). Thus, the lid open process is finished, and the computer apparatus 1 is released from the transfer mode and is operative.

Figure 8:
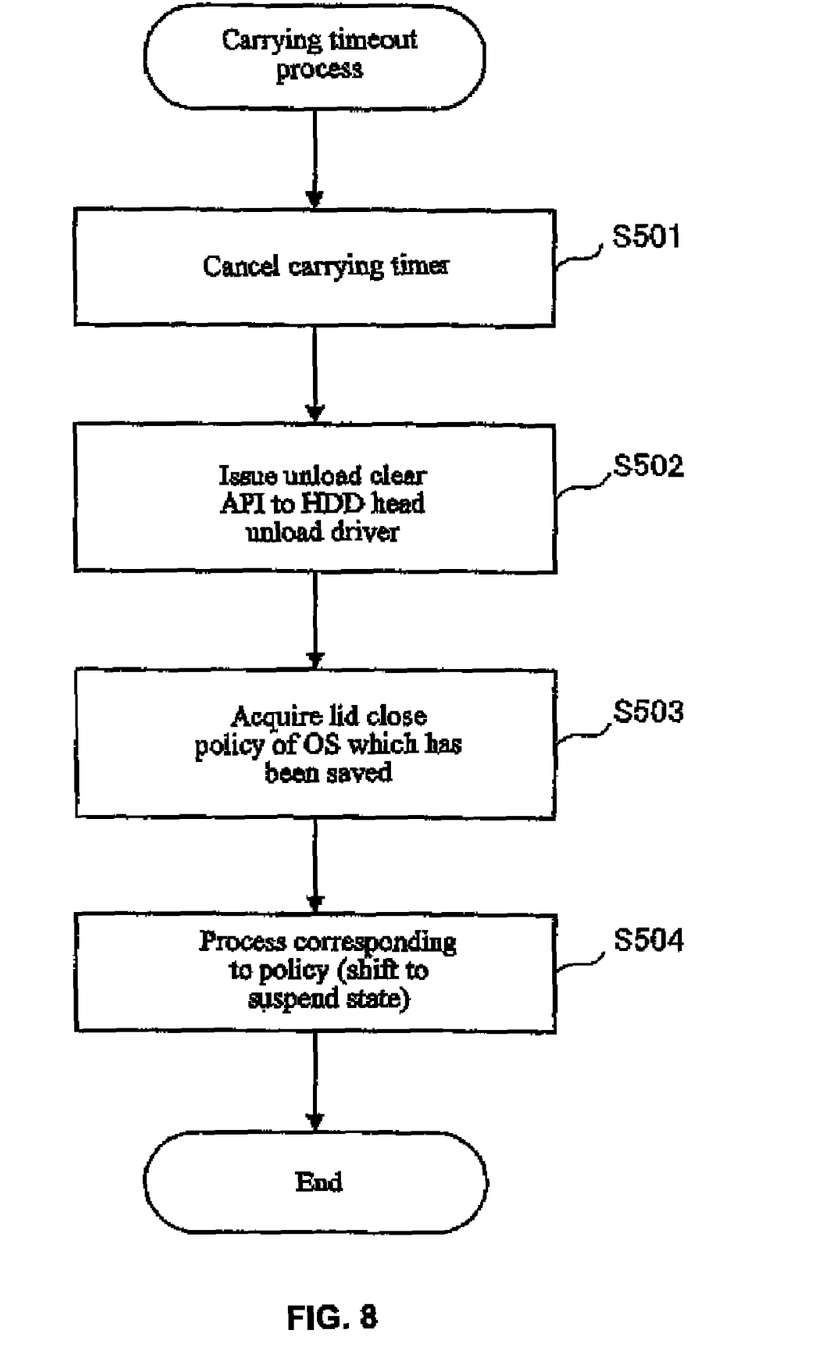
FIG. 8 is a flowchart showing a carrying timeout process executed after a specified time has elapsed in a transfer mode entered as a result of closure of the lid.

FIG. 8 is a flowchart showing a carrying timeout process executed after a specified time has elapsed in the transfer mode entered as a result of closure of the lid 3. After the specified time for a shift to the suspend mode has elapsed, the carrying timer handler 115 of the transfer mode process application 110 cancels the carrying timer (step 501). Further, since the current data contents must be saved to the HDD 31 before the suspend state is entered, the HDD unload and restart request handler 111 issues an unload clear API to the HDD head unload driver 105 (step 502). Further, as described in step 202 in FIG. 5, before the transfer mode is entered as a result of closure of the lid 3, the ACPI operating system (OS) 101 changes the policy. Accordingly, the carrying timer handler 115 acquires the lid close policy of the OS which has been saved, in order to return to the normal suspend (step 503). The carrying timer handler 115 then executes a process required to shift to the suspend state and corresponding to the policy (step 504). The timeout process is thus finished.

As described above, in the prior art, when the notebook PC (computer apparatus 1) is temporarily transferred from a desk to a meeting room, if the PC is suspended, then a long time is required for the resume. Thus, disadvantageously, the remaining part of the work cannot be immediately started. Specifically, the suspend disconnects the PC from the network, so that the user must wait for a long time on the order of minutes during the resume. Thus, in the prior art, many users carry the notebook PC with the lid 3 unclosed and the PC remaining in operation. When the notebook PC is transferred while remaining in operation, it is unstable and is likely to fall. The fall is in turn likely to cause troubles such as destruction of data. In particular, the wireless network technology has made progress, and network connections can now be freely made in a predetermined area such as the office. Accordingly, the computer apparatus 1 is often transferred and used in various places. The above problem is thus serious.

However, in the present embodiment defines the "transfer mode" in which the notebook PC (computer apparatus) is to be transferred, it is temporarily disabled so as to be immediately used after the transfer. In this transfer mode, the functions relating to possible troubles during a transfer are locked. According to the present embodiment, as a preferred example, the HDD 31 is brought into an unload state. In addition to the functions relating to the troubles, it is possible to turn off functions that are not used when these functions are locked, functions that are not used during the transfer, and functions that can be started up immediately after the lid 3 has been opened (started up in a short time enough to prevent the user from feeling stress). According to the present embodiment, as a preferred example, the LCD 4 is turned off.

Applicants have proposed an APS (Active Protection System) technique for allowing a head to withdraw from a magnetic disk rotating at high speed when vibration or a shock is sensed, thus preventing data from being destroyed. However, according to the present embodiment, even without the sensor sensing vibration or a shock, an IDE filter driver (HDD head unload driver 105 and IDE driver 106) can enable the unloading of the HDD 31.

Further, the transfer mode state can be entered by closing the lid 3. Moreover, the present embodiment proposes the timer-based transition system with which the transfer mode shifts to the conventional "lid close" settings. Furthermore, when the transfer mode shifts to the normal operation mode, the notebook PC can be used immediately after the shift. Thus, in the present embodiment, when the suspend mode shifts to the normal operation mode, the user is requested to input the password as in the case of the prior art. When the transfer mode shifts to the normal operation mode, the user is not requested to input the password. In this manner, the request for the password is made (or not made) depending on the state transition. This makes it possible to keep balance between security and quick start-up depending on the usage.

The control method according to the present embodiment can be expanded into programs executed by a computer having a portable apparatus main body. When these programs are provided to the computer, they may be installed in an electronic apparatus such as the notebook PC. Alternatively, the programs to be executed by the electronic apparatus (computer) such as the notebook PC may be stored in a storage medium from which the electronic apparatus (computer) can read the programs. The storage medium may be, for example, a DVD medium or a CD-ROM medium. A DVD device or a CD-ROM reading device reads the programs, which are then stored in a flash ROM or the like for execution. Further, these programs may be provided by a program transmitting device via a network.

The present invention is applicable to a storage medium as follows. That is, the present invention provides a storage medium storing a program allowing a portable computer to function as first means for becoming aware that a lid of the computer is closed in a normal operation mode corresponding to a normal use state, to shift the computer to transfer mode in which a function that may be affected while the electronic apparatus is being transferred is temporarily disabled with a CPU remaining operative, and as second means for becoming aware that the lid is opened in the transfer mode, to shift the computer to the normal operation mode.

The present invention also provides a storage medium storing a program allowing a portable computer to function as third means for saving an operation performed in the normal operation mode to a predetermined memory after a predetermined time has elapsed in the transfer mode and shifting the electronic apparatus to a power saving mode in which only minimum power required to retain data is used to save power consumption.

The present invention also provides a storage medium storing a program allowing a portable computer to function as fourth means for shifting the computer from the power saving mode to the normal operation mode, wherein the second means executes a shift to the normal operation without requesting a password from a user, and the fourth means executes a shift to the normal operation by requesting the password from the user.

The present invention is applicable not only to a portable computer such as a notebook PC but also to various portable electronic apparatus.

Embodiments of the present invention include various functions, which have been described above. The functions may be performed by hardware components or may be embodied in machine-executable instructions as firmware or software, which may be used to cause a general-purpose or special-purpose processor programmed with the instructions to perform the functions. Alternatively, the functions may be performed by a combination of hardware, firmware and software.

The word "circuit" or "circuitry" is used in the summary, description, and/or claims. As is well known in the art, the word "circuitry" includes all levels of available integration, e.g., from discrete logic to the highest level of integration, and includes programmable logic components programmed to perform the functions of an embodiment as well as general-purpose or special-purpose processors programmed with instructions to perform the functions.

The order of steps given herein is for exemplary purposes only and should not be interpreted as limiting with respect to other embodiments which are possible using a different order of steps in implementing the inventive concepts described herein. Any lettering or numbering of steps in the claims are for the purpose of improving clarity and do not imply any particular order of steps to be taken. Similarly, terms such as "a first step" and "a second step" are used to establish antecedent basis for these terms and do not necessarily imply any particular order.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
    a body having a CPU therein;
    a lid, wherein the apparatus is used by opening the lid for the body;
    a sensor circuit which determines whether said lid is opened or closed;
    a first circuit, coupled to said sensor circuit, which stops a first operating state and shifts the apparatus to a transfer mode in response to sensing that the lid is closed, wherein the transfer mode stops an operating state of a device that may be damaged by a transfer of the apparatus without stopping the CPU and without stopping devices that take a predetermined amount of time to start up, wherein the devices that take a predetermined amount of time to start up comprises at least a wireless LAN device; and
    a second circuit, coupled to said sensor circuit, which shifts the apparatus to the first operating state in response to sensing that the lid is opened, wherein the second circuit clears the stoppage of the operating state of the device that may be damaged by a transfer of the apparatus.

2. An apparatus according to claim 1, further comprising a hard disk drive, wherein the operating state of the device stopped by said first circuit is the operating state of the hard disk drive.

3. An apparatus according to claim 1, further comprising a display device, wherein said first circuit further turns off the display device.

4. An apparatus according to claim 1, further comprising a third circuit for saving a state of an operation performed to a predetermined memory to stop the CPU on condition that a predetermined time has elapsed since said first circuit stopped the operating state of the device.

5. Apparatus according to claim 4, wherein
    said second circuit allows a shift to the first operating state without requesting a user to input a password, and
        in a case where a state in which the CPU is stopped by said third circuit and the apparatus shifts back to the first operating state, the user is requested to input the password.

6. An apparatus according to claim 1 wherein the first circuit is adapted to cause a Hard Disk Drive to enter a head unload state.

7. An apparatus according to claim 1 wherein the first circuit is further adapted to stop power supply to a disk drive.

8. A method comprising:
    a first step of setting a portable electronic apparatus in a first operating state;
        a second step of, in response to determining that a lid of the portable electronic apparatus is closed in the first operating state, shifting the portable electronic apparatus to a transfer mode in which an operating state of a device that may be damaged while the portable electronic apparatus is being transferred is temporarily stopped with a CPU of the portable electronic apparatus and devices that take at least 10 seconds to start up remaining operative, wherein said devices that take at least 10 seconds to start up comprises at least a wireless LAN device; and
    a third step of shifting the portable electronic apparatus to the first operating state in response to opening of the lid, wherein the third step clears the stoppage of the operating state of the device that may be damaged by a transfer of the apparatus.

9. A method according to claim 8, wherein said third step shifts the transfer mode to the first operating state without requesting a user to input a password.

10. A method according to claim 8, further comprising a fourth step of saving an operation performed in the first operating state to a predetermined memory after a predetermined time has elapsed in the transfer mode, and shifting the electronic apparatus to a power saving mode in which a minimum amount of power required to retain data is used.

11. A method according to claim 8 wherein the second step further comprises: stopping an operation of a Hard Disk Drive.

12. A method according to claim 8 wherein the second step further comprises: causing a Hard Disk Drive to enter a head unload state.

13. A method according to claim 8 wherein the second step further comprises: stopping power supply to a disk drive.

14. A computer-readable product comprising a storage medium which stores instructions which when executed by a portable computer perform a method comprising:
    (a) in response to closing of a lid of the portable computer in a first operating state, shift the portable computer to a transfer mode in which an operating state of a device that may be damaged while the portable computer is being transferred is temporarily stopped with a CPU of the portable computer and devices that take at least 10 seconds to start up remaining operative, wherein said devices that take at least 10 seconds to start up comprises at least a wireless LAN device; and
    (b) shift the portable computer to the first operating state in response to opening of the lid, wherein the stoppage of the operating state of the device that may be damaged by a transfer of the apparatus is cleared.

15. A product according to claim 14, wherein the instructions are further effective to:
    (c) save an operation performed in the first operating state to a predetermined memory after a predetermined time has elapsed in the transfer mode and shift the portable computer to a power saving mode in which minimum power is required to retain data.

16. A product according to claim 15, wherein the instructions are further effective to:
    (d) shift the portable computer from the power saving mode to the first operating state, and
    with step (b), a shift to the first operating state is executed without requesting a password from a user, and with step (d), a shift to the first operating state is executed by requesting the password from the user.

* * * * *